US011645030B2

(12) United States Patent
Schmid (10) Patent No.: US 11,645,030 B2
(45) Date of Patent: May 9, 2023

(54) SCALABLE MULTIVIEWER SYSTEM AND METHOD FOR DISTRIBUTING DATA

(71) Applicant: Rohde & Schwarz GmbH & Co. KG, Munich (DE)

(72) Inventor: Bjoern Schmid, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/898,101

(22) Filed: Jun. 10, 2020

(65) Prior Publication Data

US 2021/0389921 A1 Dec. 16, 2021

(51) Int. Cl.
*H04L 67/565* (2022.01)
*G06F 3/14* (2006.01)

(52) U.S. Cl.
CPC .......... *G06F 3/1423* (2013.01); *H04L 67/565* (2022.05)

(58) Field of Classification Search
CPC .................................................... G06F 3/1423
USPC ....... 709/246; 248/122.1; 345/560; 707/736; 375/240.12, 240.25; 370/264; 710/100
See application file for complete search history.

(56) References Cited

U.S. PATENT DOCUMENTS

| | | | |
|---|---|---|---|
| 8,537,838 B2 | 9/2013 | Patel et al. | |
| 2003/0015632 A1* | 1/2003 | Dunn | F16M 13/02 248/122.1 |
| 2005/0254440 A1* | 11/2005 | Sorrell | H04N 7/14 370/264 |
| 2009/0063665 A1* | 3/2009 | Bagepalli | H04L 63/0428 710/100 |
| 2011/0216082 A1* | 9/2011 | Caskey | G06F 3/1446 345/560 |
| 2013/0266077 A1* | 10/2013 | Boyce | H04N 19/463 375/240.25 |
| 2014/0310273 A1* | 10/2014 | Mital | G06F 40/18 707/736 |
| 2016/0073126 A1* | 3/2016 | Zhang | H04N 19/103 375/240.12 |
| 2019/0102135 A1* | 4/2019 | Lai | G06K 7/1413 |

* cited by examiner

*Primary Examiner* — Ruay Ho
(74) *Attorney, Agent, or Firm* — Christensen O'Connor Johnson Kindness PLLC (57) ABSTRACT

A scalable multiviewer system comprises at least one communication module. The at least one communication module comprises at least one input being associated with at least one data source. The at least one communication module comprises at least one output being associated with at least one data sink. The at least one communication module comprises at least one channel interface for an inter-module communication channel configured to transfer data between the at least one communication module and at least one further communication module. The at least one communication module comprises a processor configured to receive an input signal from the at least one input, to downscale the input signal based on at least one preset communication parameter, and to selectively transmit the downscaled input signal to either the output or to the channel interface for the inter-module communication channel based on the at least one preset communication parameter.

18 Claims, 2 Drawing Sheets

Fig. 2

SCALABLE MULTIVIEWER SYSTEM AND METHOD FOR DISTRIBUTING DATA

FIELD OF THE DISCLOSURE

Embodiments of the present disclosure generally relate to a scalable multiviewer system. Embodiments of the present disclosure further relate to a method for distributing data from at least one data source to several data sinks via a scalable multiviewer system.

BACKGROUND

Multiviewer systems allow a user to observe several different audio- and/or video signals simultaneously. Traditional multiviewer systems comprise several individual monitors, which each display a single video signal coming from a video source to which the monitor is physically coupled.

These traditional multiviewer systems are increasingly replaced by modern multiviewer systems, wherein a single monitor may receive video signals from several video sources, such that all video signals can be viewed on the same monitor simultaneously or upon demand. Thus, with these modern multiviewer systems, the signals from the several video sources can be displayed on a single large monitor.

Moreover, the signals from these several video sources may be distributed to and viewed at several different locations. However, this may require a multiple replication of the original video signal, such that all video signals are transmitted to all relevant viewing locations.

The disadvantage of this approach is that the bandwidth required for the transmission of the video signals is rather high due to the multiple replication of the video signals.

Accordingly, there is a need for a multiviewer system as well as a method that allow for a more efficient distribution of data.

SUMMARY

Embodiments of the present disclosure provide a scalable multiviewer system. In an embodiment, the system comprises at least one communication circuit or module. The at least one communication module comprises at least one input having a first network circuit or interface, wherein the at least one input is associated with at least one data source. The at least one communication module also comprises at least one output having a second network circuit or interface, wherein the at least one output is associated with at least one data sink. The at least one communication module also comprises at least one channel circuit or interface for an inter-module communication channel configured to transfer data between the at least one communication module and at least one further communication module.

The at least one communication module comprises a processing circuit or module, wherein the processing module is connected to the at least one input, the at least one output, and the at least one channel interface for the inter-module communication channel in a signal transmitting manner. The processing module is configured to receive an input signal from the at least one input. The processing module is configured to downscale the input signal based on at least one preset communication parameter, thereby generating a downscaled input signal. The processing module is configured to selectively transmit the downscaled input signal to the at least one output or to the at least one channel interface for the inter-module communication channel based on the at least one preset communication parameter.

Therein and in the following, the term "data sink" is used to denote all kinds of devices on an output side of the at least one communication module that may receive the (downscaled) input signal transmitted by the at least one communication module. For example, the term "data sink" comprises a user device, such as a personal computer, a laptop, a smartphone, a tablet or a dedicated user-side multiviewer device. In other words, the term "data sink" is associated with a respective client-side device.

The term "communication module" is used to denote a functional unit comprising suitable circuitry, such as hardware and/or software. Generally, the communication modules may be established as individual physical modules of a single server, and/or as individual physical modules of several interconnected servers forming a network.

The at least one data source may be established as a video signal source and/or as an audio signal source. Accordingly, the input signal may be a video signal and/or an audio signal.

In some embodiments, the input signal is packetized. In other words, the input signal comprises several data packages, wherein the information to be transmitted is comprised in these data packages.

Alternatively or additionally, the processing module may be configured to packetize the input signal before transmitting the input signal to the output and/or to the channel interface for the inter-module communication channel.

According to the present disclosure, the (downscaled) input signal is transmitted via the at least one communication module only to certain data sinks, namely only to such data sinks that are specified by the at least one communication parameter. In other words, the at least one communication parameter determines which data sink receives signals from which data sources.

Accordingly, the network addresses of the data sinks that need to receive a specific (downscaled) input signal may be specified by the at least one preset communication parameter.

Thus, the overall network traffic is reduced, as the (downscaled) input signal is transmitted only to those data sinks that really need it or that have requested to receive the corresponding input signal.

Moreover, no central controller is required in order to distribute different input signals to different data sinks, as the at least one communication module (or several communication modules) is already programmed to distribute the input signal in the intended way.

Moreover, according to the present disclosure the at least one input signal is downscaled based on the at least one communication parameter. In other words, the processing module may reduce the data size of the corresponding input signal, for example by reducing the data rate and/or the sample rate of the corresponding input signal, or by compressing the corresponding input signal. This way, the amount of network traffic is further reduced, as the input signal is downscaled already at the server side, and not on the client side.

In some embodiments, the amount of downscaling is specified by the at least one communication parameter. Thus, the at least one communication parameter specifies which data sinks receive (downscaled) input signals from which data sources. Moreover, the at least one communication parameter specifies, for example, the data size and/or quality of the (downscaled) input signals transmitted to the data sources.

It is noted that, of course, the input signal may also be transmitted to the data sinks without previous downscaling, if no downscaling is necessary.

In some embodiments, the processing module may comprise one or several processing units. For example, the processing module comprises one or several central processing units (CPUs), graphical processing units (GPUs), field programmable gate arrays (FPGAs), application specific integrated circuits (ASICs), etc.

In some embodiments, the processing module comprises a processor, a microprocessor, a processing unit or other means for processing that is connected to each of the input, the output, and the channel interface for the inter-module communication channel.

Alternatively, the processing module may comprise several interconnected processors, microprocessors, processing units and/or other means for processing, wherein at least one of the several interconnected processing means is connected to only one of the input, the output, and the channel interface for the inter-module communication channel.

In some embodiments, the processing module comprises three interconnected processors, microprocessors, processing units and/or other means for processing, wherein each of the three interconnected processing means is connected to only one of the input, the output, and the channel interface for the inter-module communication channel.

According to an aspect of the present disclosure, the at least one preset communication parameter is programmable via a communication bus of the multiviewer system. Thus, a user may simply select the data sources from which the data shall be transferred to the data sink associated with the user. The at least one communication parameter is then re-programmed via the communication bus such that the inputs signals from the different data sources are distributed correctly.

Again, no central controller for the communication modules is required. Instead, the communication parameters of the communication modules are adapted via the communication bus and stored on the respective communication modules, such that the input signals from different data sources are distributed correctly.

According to another aspect of the present disclosure, the communication bus is configured to distribute a parameter adaptation request from the at least one data sink to the at least one communication module. Generally, the parameter adaptation request corresponds to a request of the user to receive the signals from certain ones of the data sources with a certain quality. In other words, the user may choose the data sources from which the signals are to be received and the respective signal quality via the parameter adaptation request.

In some embodiments, the communication bus is configured to distribute the parameter adaptation request to all communication modules. In other words, the communication bus may be configured to broadcast the parameter adaption request to the communication modules.

For instance, the communication bus is configured to multicast the parameter adaption request when distributing the parameter adaption request.

In a further embodiment of the present disclosure, the multiviewer system is configured such that the at least one preset communication parameter is programmable via the output by the communication bus of the multiviewer system. Thus, the individual communication modules may receive the parameter adaptation request described above via the respective output of the respective communication module. Additionally or alternatively, the communication modules may receive the parameter adaptation request via the respective channel interface for the inter-module communication channel, i.e. from another communication module.

In some embodiments, the multiviewer system comprises a client-side device connected with the output, wherein the client-side device comprises a user input/output circuit or interface via which the at least one preset communication parameter is set to direct the input signal in a defined manner and with a defined quality. For example, a list of available data sources may be displayed to the user via the user interface. Thus, the user may simply select the data sources from which signals are to be received and the respective signal quality via the user interface. The client-side device may then automatically generate a corresponding parameter adaptation request that is then transmitted to the communication modules by means of the communication bus.

The communication parameters of each of the communication modules may be adapted based on the parameter adaptation request. In other words, the complete network may be reconfigured based on the parameter adaptation request such that the input signals from the data sources are distributed to the data sinks correctly.

In a further embodiment of the present disclosure, the processing module is configured to transmit the downscaled input signal to the at least one output or to the at least one channel interface for the inter-module communication channel based on the parameter adaptation request. In other words, the respective (downscaled) input signal may be transmitted to the corresponding data sink only if a corresponding request has been received, namely the parameter adaptation request. If no such request has been received, no (downscaled) input signal may be transmitted to the data sink at all. Accordingly, the (downscaled) input signals are transmitted only on request. Thus, unnecessary network traffic is avoided.

In some embodiments, the parameter adaptation request comprises a request for adapting at least one of the following parameters: a communication protocol, a data rate, a sample rate, a resolution, and a data compression. In other words, the user may not only choose from which data sources the (downscaled) input signals are to be received, but may also choose a suitable communication protocol by means of which the respective (downscaled) input signal is transmitted to the data sink. Alternatively or additionally, the user may choose the quality (and thus the data volume needed) of the transmitted (downscaled) input signal by adapting the data rate, the sample rate, the resolution and/or the data compression.

According to an aspect of the present disclosure, the processing module is configured to analyze the input signal, thereby determining at least one quality parameter associated with the input signal. Generally speaking, the at least one quality parameter is indicative of the quality of the data stream associated with the respective input signal. More precisely, the at least one quality parameter may indicate a resolution of the data stream, a data rate of the data stream, a sample rate of the data stream and/or a data compression of the data stream.

In some embodiments, the processing module may compare the quality requested by a data sink with the quality of the corresponding data stream based on the at least one quality parameter. If the requested quality is lower than the actual quality of the data stream, the processing module may downscale the input signal in order to match the requested quality.

According to another aspect of the present disclosure, the at least one communication module comprises at least one network interface card, wherein the at least one network interface card comprises at least one of the first network interface, the second network interface, and the channel interface for the inter-module communication channel. Accordingly, all or at least more than one of the interfaces may be integrated onto a single network interface card. Thus, less hardware is needed and the costs of the communication module are reduced.

Alternatively, the communication module may comprise several interconnected network interface cards that are each associated with at least one of the input, the output, and the channel interface for the inter-module communication channel. This way, a higher bandwidth may be achieved.

The communication bus may be configured to distribute a list of available data sources to the at least one data sink. Thus, instead of distributing, for instance multicasting or rather broadcasting, all input signals to all data sinks, only the list of available data sources is distributed to the data sinks. As already explained above, the user may choose which signals from which data source shall be transmitted to the respective data sink. As the list of available data sources has a considerably lower data volume than the input signals, the overall needed network bandwidth is reduced.

In some embodiments, the communication bus is configured to distribute a list of available data sources to all data sinks. In other words, the communication bus may be configured to broadcast the list of available data sources to the data sinks.

The list of available data sources may also comprise the quality parameters associated with the input signals. Thus, the users of the client-side devices associated with the data sinks are provided with an overview of all available input signals and of the respective quality of the input signals.

According to another aspect of the present disclosure, no central control module is provided in order to control the communication modules. As already mentioned above, no central controller is required in order to distribute different input signals to different data sinks, as the at least one communication module (or several communication modules) is already programmed to distribute the input signal in the intended way. Instead, if changes are requested, the communication parameters of the communication modules are adapted via the communication bus and stored on the respective communication modules, such that the input signals from different data sources are distributed correctly according to the requested changes.

The communication bus may be based on a Message Queuing Telemetry Transport (MQTT) protocol. This protocol requires a particularly low bandwidth, such that the network traffic is further reduced.

Alternatively, the communication bus may be based on an Advanced Message Queuing Protocol (AMQP), a Constrained Application Protocol (CoAP), an Extensible Messaging Presence Protocol (XMPP) or any other suitable protocol.

In a further embodiment of the present disclosure, the at least one data source is immediately connected to at most one communication module. Thus, input signals generated by each of the data sources are each only received by exactly one communication module (and not multiple times). Accordingly, the network traffic is further reduced.

It is noted that several data sources may be connected to the same communication module, but not the other way around. Accordingly, each communication module may receive input signals from several data sources. However, each data source transmits a respectively generated input signal to only one communication module.

In some embodiments, the at least one preset communication parameter comprises at least one of the following parameters: a communication protocol, a data rate, a sample rate, a resolution, and a data compression. In other words, the user may not only choose from which data sources (downscaled) input signals are to be received, but may also choose a suitable communication protocol by means of which the respective (downscaled) input signal is transmitted to the data sink. Additionally, the user may choose the quality (and thus the data volume needed) of the transmitted (downscaled) input signal by adapting the data rate, the sample rate, the resolution and/or the data compression.

According to an aspect of the present disclosure, the multiviewer system comprises at least two communication modules, wherein the at least two communication modules are interconnected via their channel interfaces for the inter-module communication channel. As each of the communication modules comprises a processing circuit or module, the overall available computational power of the multiviewer system is enhanced. For example, the individual communication modules may correspond to individual modules of a single server or to individual modules of different interconnected servers forming a network.

According to another aspect of the present disclosure, a first one of the at least two communication modules is connected to at least a first data sink via the output of the first communication module, wherein a second one of the at least two communication modules is connected to at least a second data sink via the output of the second communication module, and wherein the first data sink and the second data sink are different from each other. In some embodiments, each communication module may be connected to a set of data sinks, wherein the sets of data sinks are pairwise disjoint.

In other words, each client-side device is connected to a single server, and the requested (downscaled) input signal is transmitted to the client-side device only via that particular server. This way, the network traffic is further reduced.

In a further embodiment of the present disclosure, the processor modules of the respective communication modules are configured to communicate with each other. The processing modules may use the communication protocol of the communication bus, for example the Message Queuing Telemetry Transport protocol. Alternatively or additionally, the processing modules may use a separate communication protocol for communicating with each other.

Embodiments of the present disclosure further provide a method for distributing data from at least one data source to several data sinks via a scalable multiviewer system, for example via the scalable multiviewer system described above. In an embodiment, The method comprises the following steps:

receiving an input signal from the at least one data source via a first communication module;

down-scaling the input signal based on at least one preset communication parameter, thereby generating a downscaled input signal; and selectively transmitting the downscaled input signal to the at least one output or to at least a second communication module based on the at least one preset communication parameter.

Regarding the advantages and further properties of the method, reference is made to the explanations given above with respect to the multiviewer system, which also hold for the method and vice versa.

According to an aspect of the present disclosure, the at least one preset communication parameter is programmable via a communication bus of the multiviewer system. Thus, a user may simply select the data sources from which the data shall be transferred to the data sink associated with the user. The at least one communication parameter is then re-programmed via the communication bus such that the inputs signals from the different data sources are distributed correctly.

No central controller for the communication modules is required. Instead, the communication parameters of the communication modules are adapted via the communication bus and stored on the respective communication modules, such that the input signals from different data sources are distributed correctly.

In a further embodiment of the present disclosure, a parameter adaptation request is distributed from the at least one data sink to the at least one communication module via the communication bus. Generally, the parameter adaptation request corresponds to a request of the user to receive the signals from certain ones of the data sources with a certain quality. In other words, the user may choose the data sources from which the signals are to be received and the respective signal quality via the parameter adaptation request.

In some embodiments, the parameter adaptation request may be distributed to all communication modules. In other words, the communication bus may be configured to broadcast the parameter rotation request to the communication modules.

In some embodiments, the downscaled input signal is transmitted to the at least one output or to at least one channel interface for an inter-module communication channel based on the parameter adaptation request. In other words, the respective (downscaled) input signal may be transmitted to the corresponding data sink only if a corresponding request has been received, namely the parameter adaptation request. If no such request has been received, no (downscaled) input signal may be transmitted to the data sink at all. Accordingly, the (downscaled) input signals are transmitted only on request. Thus, unnecessary network traffic is avoided.

According to another aspect of the present disclosure, the parameter adaptation request comprises a request for adapting at least one of the following parameters: a communication protocol, a data rate, a sample rate, a resolution, and a data compression. In other words, the user may not only choose from which data sources (downscaled) input signals are to be received, but may also choose a suitable communication protocol by means of which the respective (downscaled) input signal is transmitted to the data sink. Alternatively or additionally, the user may choose the quality (and thus the data volume needed) of the transmitted (downscaled) input signal by adapting the data rate, the sample rate, the resolution and/or the data compression via the parameter adaptation request.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
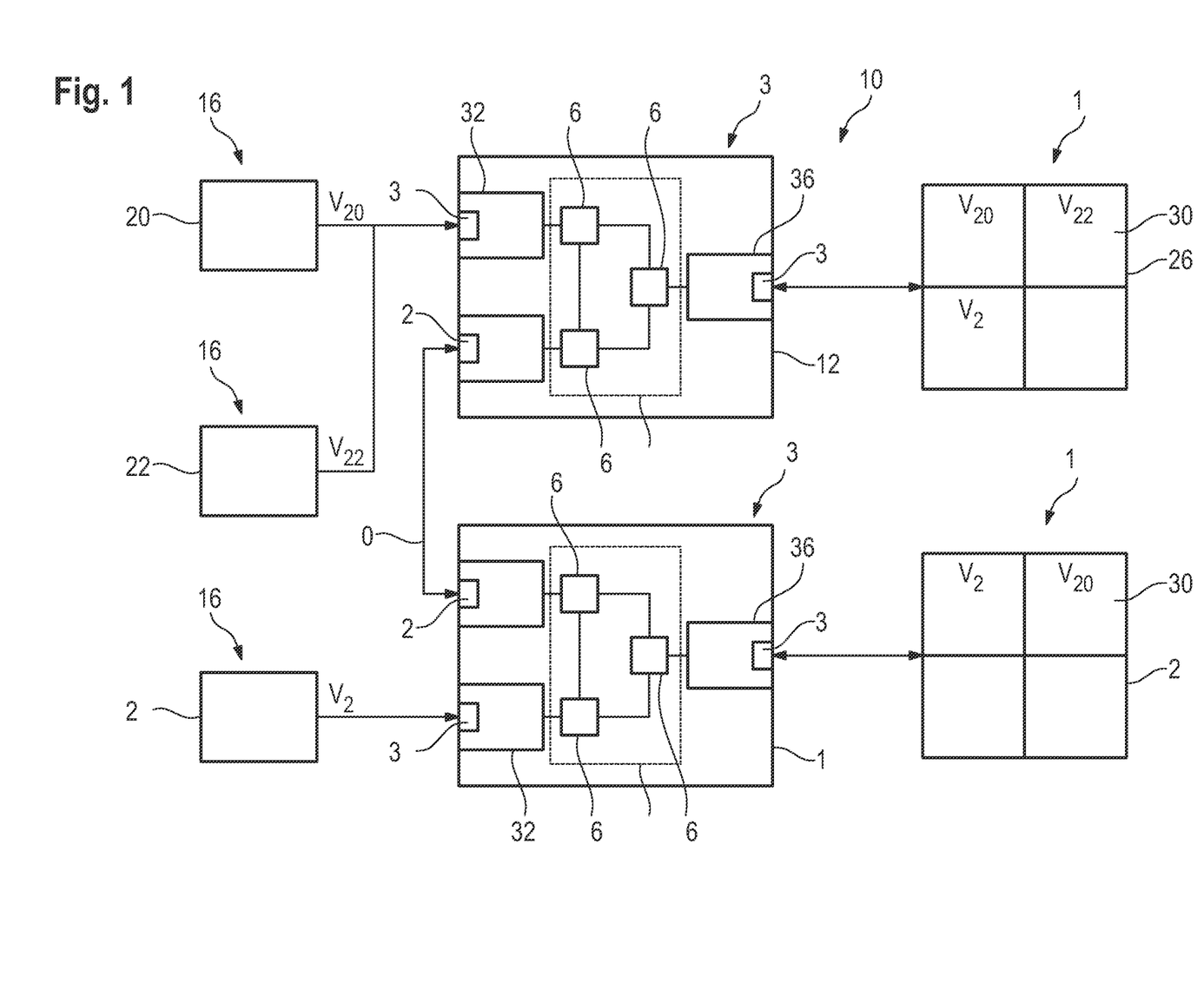
FIG. 1 schematically shows a block diagram of a scalable multiviewer system according to an embodiment of the present disclosure.

FIG. 1 schematically shows a representative block diagram of a scalable multiviewer system 10. The multiviewer system 10 comprises a first communication circuit or module 12, a second communication circuit or module 14, several data sources 16, and several data sinks 18.

Therein and in the following, the term "data sink" is used to denote all kinds of devices on a receiving side of the multiviewer system 10. For example, the term "data sink" comprises a user device, such as a personal computer, a laptop, a smartphone, a tablet or a dedicated user-side multiviewer device. In other words, the term "data sink" is associated with a respective client-side device.

Moreover, the term "communication module" is used to denote a functional unit comprising suitable circuitry, such as hardware and software. Generally, the communication modules may be established as individual physical modules of a single server, and/or as individual physical modules of several interconnected servers forming a network.

In the example shown in FIG. 1, the several data sources 16 comprise a first video and/or audio source 20 ("VA source" in the following), a second VA source 22, and a third VA source 24. It is noted that the number of three VA sources 20, 22, 24 is chosen only for illustration purposes. Of course, the multiviewer system 10 may comprise any other number of VA sources.

Each of the data sources 16 is immediately connected to exactly one of the communication modules 12, 14. Thus, input signals generated by the data sources 16 are only transmitted to one of the communication module 12, 14, respectively.

The several data sinks 18 correspond to a first client-side device 26 and a second client-side device 28. The client-side devices 26, 28 may be located at different geographic locations.

Each of the client-side devices 26, 28 comprises several display areas 30. The display areas 30 may be sub-areas of a larger display. Alternatively, the display areas 30 may be established as separate display devices, e.g. monitors.

It is noted that the number of two client-side devices 26, 28 is chosen only for illustration purposes. Of course, the multiviewer system 10 may comprise any other number of signal sinks, for example client-side devices.

In the exemplary embodiment shown in FIG. 1, the first communication module 12 is connected to the first client-side device 26, and the second communication module 14 is connected to second client-side device 28. In general, each communication module 12, 14 may be connected to a set of data sinks 18, wherein the sets of data sinks 18 are pairwise disjoint. In other words, each client-side device 26, 28 is connected to a single server, and the requested input signal is transmitted to the client-side device 26, 28 only via that particular server.

Generally speaking, the multiviewer system 10 is configured to distribute input signals generated by the data sources 16 to the data sinks 18 in a particular manner, which will be explained in more detail below.

Therein, the input signals respectively may be established as a video signal and/or as an audio signal ("VA signal" in the following).

Without restriction of generality, the case of the input signals being pure video signals will be discussed in the following. Accordingly, in the following the input signals generated by the VA sources 20, 22, 24 are denoted by $v_{20}$, $v_{22}$, and $v_{24}$, respectively.

The users of the client-side devices 26, 28 may choose which of the input signals are to be displayed on the individual display areas 30.

In the example shown in FIG. 1, all three input signals $v_{20}$, $v_{22}$, $v_{24}$ are to be displayed on the display areas 30 of the first client-side device 26, while only the two input signals $v_{20}$ and $v_{24}$ are to be displayed on the display areas 30 of the second client-side device 28.

The first communication module 12 and the second communication module 14 each comprise an input 32 with a first network interface 34, an output 36 with a second network interface 38.

Further, an inter-module communication channel 40 is provided between the communication modules 12, 14 wherein each communication module 12, 14 has a dedicated channel interface 42 associated with the inter-module communication channel 40.

The communication modules 12, 14 may comprise at least one network interface card 43 (a collection of hardware circuits), wherein the at least one network interface card 43 comprises the first network interface 34, the second network interface 38 and/or the channel interface 42.

Alternatively, the communication modules 12, 14 may comprise several interconnected network interface cards 43 that are each associated with at least one of the input 32, the output 36, and the channel interface 42 for the inter-module communication channel 40.

The communication modules 12, 14 further each comprise a processing circuit or module 44. In the exemplary embodiment shown in FIG. 1, the processing module 44 comprises three processing units 46. For example, the processing units 46 may each be established as a CPU, as a GPU, as a FPGAs, or other processor means, etc.

In some embodiments, each of the input 32, the output 36 and the channel interface 42 for the inter-module communication channel 40 is immediately connected to only one of the processing units 46, respectively. Moreover, the processing units 46 are interconnected with each other.

It is noted that the number of three processing units 46 is chosen only for illustration purposes. The processing module 44 may also comprise any other number of processing unit 46, for example one or two processing units 46 or even more than three processing units 46.

In some embodiments, the processing module 44 may comprise a single processing unit 46 that is immediately connected to each of the input 32, the output 36, and the channel interface 42 for the inter-module communication channel 40.

Alternatively, the processing module 44 may comprise two processing units 46. For example, one of the two processing units 46 may be immediately connected to the input 32 and the channel interface 42 for the inter-module communication channel 40, and the other one of the two processing units 46 may be immediately connected to the output 36.

Figure 2:
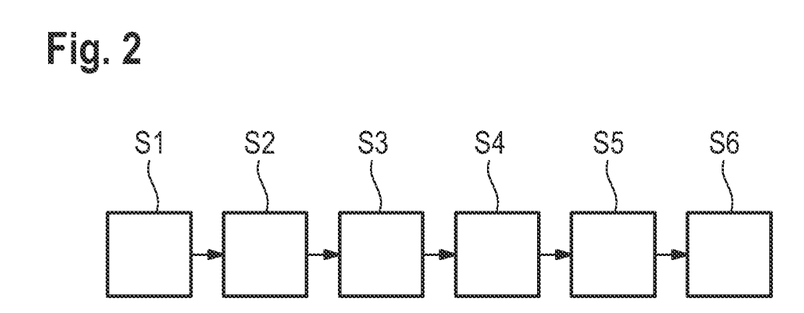
FIG. 2 shows a flow chart of a method according to an embodiment of the present disclosure.

The multiviewer system 10 is configured to perform a method for distributing data from the data sources 16 to the data sinks 18, which is described in the following with reference to FIG. 2.

The input signals $v_{20}$, $v_{22}$, and $v_{24}$ are received by the communication modules 12, 14 via the respective input 32 and forwarded to the processing module 44, for example the respective processing unit 46 connected to the input 32 (step S1).

The respective processing unit 46 processes and analyzes the received input signal or the received input signals, thereby determining at least one quality parameter associated with the input signal (step S2).

Generally speaking, the at least one quality parameter is indicative of the quality of the video stream associated with the respective input signal. More precisely, the at least one quality parameter may indicate a resolution of the video stream, a data rate of the video stream, a sample rate of the video stream and/or a data compression of the video stream.

A list of all available data sources 16 is broadcasted to all data sinks 18 via a communication bus of the multiviewer system 10 (step S3).

Therein, the communication bus may be based on a Message Queuing Telemetry Transport (MQTT) protocol. However, any other suitable type of network protocol or messaging protocol may be used for the communication bus, for instance Advanced Message Queuing Protocol (AMQP), Constrained Application Protocol (CoAP) or Extensible Messaging Presence Protocol (XMPP).

Thus, instead of broadcasting all input signals $v_{20}$, $v_{22}$, $v_{24}$ to all data sinks 18, only the list of available data sources 16 is distributed to the data sinks 18.

The list of available data sources 16 may also comprise the quality parameters associated with the input signals $v_{20}$, $v_{22}$, $v_{24}$. Thus, the users of the first clients-side device 26 and of the second client-side device 28 are provided with an overview of all available input signals $v_{20}$, $v_{22}$, $v_{24}$ and of the respective quality of the input signals $v_{20}$, $v_{22}$, $v_{24}$.

The users may then choose which of the input signals $v_{20}$, $v_{22}$, $v_{24}$ are to be received, and in which quality the input signals $v_{20}$, $v_{22}$, $v_{24}$ are to be received. Moreover, the users may choose via which communication protocol the input signals $v_{20}$, $v_{22}$, $v_{24}$ are to be transmitted to the data sinks 18.

In some embodiments, the users may perform these settings via a user interface of the respective client-side device 26, 28.

A parameter adaptation request corresponding to the settings performed by the user is generated by each of the client-side devices 26, 28, respectively. The parameter adaptation requests are each broadcasted to the communication modules 12, 14 via the communication bus of the multiviewer system 10 (step S4).

In general, the parameter adaptation request comprises a request for adapting at least one of the following parameters: a communication protocol via which the input signals $v_{20}$, $v_{22}$, $v_{24}$ are to be received by the respective client-side device 26, 28, a desired data rate with which the input signals $v_{20}$, $v_{22}$, $v_{24}$ are to be received by the respective client-side device 26, 28, a desired sample rate with which the input signals $v_{20}$, $v_{22}$, $v_{24}$ are to be received by the respective client-side device 26, 28, a desired resolution of the input signals $v_{20}$, $v_{22}$, $v_{24}$, and a data compression of the input signals $v_{20}$, $v_{22}$, $v_{24}$.

Based on the parameter adaptation requests, at least one communication parameter of the processing modules 44 is adapted, if necessary (step S5).

The at least one preset communication parameter comprises at least one of the following parameters: a communication protocol, a data rate, a sample rate, a resolution, and/or a data compression. Moreover, the at least one communication parameter in some embodiments determines which data sink 18 receives signals from which data source 16. If the preset communication parameters are already the same as requested, then the communication parameters are, of course, not adapted.

The processing modules 44 then process the input signals $v_{20}$, $v_{22}$, $v_{24}$ based on the adapted preset communication parameters and selectively forward the input signals $v_{20}$, $v_{22}$, $v_{24}$ to the respective output 36 and/or to the respective channel interface 42 for the inter-module communication channel 40 based on the adapted preset communication parameters (step S6).

Generally speaking, the processing modules 44 process and selectively forward the input signals $v_{20}$, $v_{22}$, $v_{24}$ in such a way that every one of the client-side devices 26, 28 receives the requested ones of the input signals $v_{20}$, $v_{22}$, $v_{24}$, namely in the requested quality and via the requested communication protocol. Accordingly, if the quality of one of the input signals $v_{20}$, $v_{22}$, $v_{24}$ is higher than requested by one of the client-side devices 26, 28, the respective processing module 44 may downscale the corresponding input, thereby generating a downscaled input signal. In other words, the processing module 44 may reduce the data size of the corresponding input signal $v_{20}$, $v_{22}$, $v_{24}$, for example by reducing the data rate and/or the sample rate of the corresponding input signal, or by compressing the corresponding input signal $v_{20}$, $v_{22}$, $v_{24}$.

In this case, the downscaled input signal is selectively forwarded to the respective output 36 and/or to the respective channel interface 42 associated with the inter-module communication channel 40 based on the adapted preset communication parameters.

Step S6 will be illustrated for an hypothetical example by the input signal $v_{20}$ generated by the first VA source 20.

For example, the input signal $v_{20}$ is a High Definition ("HD") video stream. The first client-side device 26 has requested to receive the input signal $v_{20}$ in HD, while the second client-side device 28 has requested to receive the input signal $v_{20}$ in Standard Definition ("SD"). Accordingly, the processing module 44 of the first communication module 12 transmits the input signal $v_{20}$ to the first client-side device 26 via the output 36 of the first communication module 12 without downscaling. However, as the second client-side device 28 requested the input signal $v_{20}$ in SD, the processing module 44 of the first communication module 12 downscales the input signal $v_{20}$ from HD to SD, thereby generating the downscaled input signal.

The downscaled input signal is then transmitted to the second communication module 14 via the inter-module communication channel 40 associated with the first communication module 12 and the second communication module 14. The downscaled input signal is then transmitted to the second client-side device 28 via the output 36 of the second communication module 14 by the processing module 44 of the second communication module 14.

Summarizing, the input signals are transmitted only to certain data sinks 18, namely only to such data sinks 18 that have requested to receive the respective input signal. Thus, a user may simply select the data sources 16 from which the data shall be transferred to the data sink 18 associated with the user. The preset communication parameters of the processing modules 44 of the communication modules 12, 14 are then re-programmed via the communication bus such that the input signals from the different data sources 16 are distributed correctly to the data sinks 18.

Therein, no central controller for the communication modules 12, 14 is required. Instead, the communication parameters of the communication modules 12, 14 are adapted via the communication bus and stored on the respective communication modules 12, 14, such that the input signals from different data sources 16 are distributed correctly.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A multiviewer system comprising:
   at least one communication module comprising:
      at least one input having a first network interface, wherein the at least one input is associated with at least one data source, wherein the at least one data source is established as a video signal source and/or as an audio signal source,
      at least one output having a second network interface, wherein the at least one output is associated with at least one data sink,
      at least one channel interface for an inter-module communication channel configured to transfer data between the at least one communication module and at least one further communication module, and
      a processing circuit connected to the at least one input, the at least one output, and the at least one channel interface for the inter-module communication channel in a signal transmitting manner,
   wherein the processing circuit is configured to:
      receive an input signal from the at least one input, wherein the input signal is a video signal and/or an audio signal,
      downscale the input signal based on at least one preset communication parameter, thereby generating a downscaled input signal, wherein the downscaled input signal is a downscaled video signal and/or a downloaded audio signal, and to
      selectively transmit the downscaled input signal to the at least one output or to the at least one channel interface for the inter-module communication channel based on the at least one preset communication parameter, such that the downscaled input signal is transmitted only to data sinks specified by the at least one communication parameter,
   wherein the multiviewer system is a scalable multiviewer system,
   wherein the at least one communication module is a single functional unit comprising the at least one input having the first network interface, the at least one output having the second network interface, the at least one channel interface, and the processing circuit,
   wherein the at least one preset communication parameter is programmable via a communication bus of the multiviewer system, and
   wherein the communication bus is based on a Message Queuing Telemetry Transport protocol, an Advanced Message Queuing Protocol, a Constrained Application Protocol, or an Extensible Messaging Presence Protocol.

2. The multiviewer system of claim 1, wherein the communication bus is configured to distribute a parameter adaptation request from the at least one data sink to the at least one communication module.

3. The multiviewer system of claim 2, wherein the processing circuit is configured to transmit the downscaled input signal to the at least one output or to the at least one channel interface for the inter-module communication channel based on the parameter adaptation request.

4. The multiviewer system of claim 2, wherein the parameter adaptation request comprises a request for adapting at least one of the following parameters: a communication protocol, a data rate, a sample rate, a resolution, and a data compression.

5. The multiviewer system of claim 1, wherein the processing circuit is configured to analyze the input signal, thereby determining at least one quality parameter associated with the input signal.

6. The multiviewer system of claim 1, wherein the at least one communication module comprises at least one network interface card, wherein the at least one network interface card comprises at least one of the first network interface, the second network interface, and the channel interface for the inter-module communication channel.

7. The multiviewer system according of claim 1, wherein the communication bus is configured to distribute a list of available data sources to the at least one data sink.

8. The multiviewer system of claim 1, wherein no central control module is provided in order to control the communication modules.

9. The multiviewer system of claim 1, wherein the at least one data source is directly connected to at most one communication module.

10. The multiviewer system of claim 1, wherein the at least one preset communication parameter comprises at least one of the following parameters: a communication protocol, a data rate, a sample rate, a resolution, and a data compression.

11. The multiviewer system of claim 1, wherein the multiviewer system comprises at least two communication modules, wherein the at least two communication modules are interconnected via their channel interfaces for the inter-module communication channel.

12. The multiviewer system of claim 11, wherein a first one of the at least two communication modules is connected to at least a first data sink via the output of the first communication module, wherein a second one of the at least two communication modules is connected to at least a second data sink via the output of the second communication module, and wherein the first data sink and the second data sink are different from each other.

13. The multiviewer system of claim 11, wherein the processing circuits of the respective communication modules are configured to communicate with each other.

14. A method for distributing data from at least one data source to several data sinks via a multiviewer system, wherein the multiviewer system is a scalable multiviewer system, the method comprising:
   receiving an input signal from the at least one data source via a first communication module, wherein the at least one data source is established as a video signal source and/or as an audio signal source, wherein the input signal is a video signal and/or an audio signal;
   down-scaling the input signal based on at least one preset communication parameter by a processing circuit, thereby generating a downscaled input signal, wherein the downscaled input signal is a downscaled video signal and/or a downscaled audio signal; and
   selectively transmitting the downscaled input signal to the at least one output or to at least a second communication module via at least one channel interface based on the at least one preset communication parameter, such that the downscaled input signal is transmitted only to data sinks specified by the at least one communication parameter, wherein the first communication module is a single functional unit comprising the at least one input having a first network interface, the at least one output having a second network interface, the at least one channel interface, and the processing circuit, wherein the at least one preset communication parameter is programmable via a communication bus of the multiviewer system, and wherein the communication bus is based on a Message Queuing Telemetry Transport protocol, an Advanced Message Queuing Protocol, a Constrained Application Protocol, or an Extensible Messaging Presence Protocol.

15. The method of claim 14, wherein a parameter adaptation request is distributed from the at least one data sink to the at least one communication module via the communication bus.

16. The method of claim 15, wherein the downscaled input signal is transmitted to the at least one output or to at least one channel interface for an inter-module communication channel based on the parameter adaptation request.

17. The method of claim 15, wherein the parameter adaptation request comprises a request for adapting at least one of the following parameters: a communication protocol, a data rate, a sample rate, a resolution, and a data compression.

18. A scalable multiviewer system comprising:
   at least one communication module, the at least one communication module comprising:
   at least one input having a first network interface, wherein the at least one input is associated with at least one data source,
   at least one output having a second network interface, wherein the at least one output is associated with at least one data sink,
   at least one channel interface for an inter-module communication channel configured to transfer data between the at least one communication module and at least one further communication module, and
   a processing circuit connected to the at least one input, the at least one output, and the at least one channel interface for the inter-module communication channel in a signal transmitting manner, wherein the processing circuit is configured to:
receive an input signal from the at least one input,
downscale the input signal based on at least one preset communication parameter, thereby generating a downscaled input signal, and
to selectively transmit the downscaled input signal to the at least one output or to the at least one channel interface for the inter-module communication channel based on the at least one preset communication parameter, wherein the at least one preset communication parameter is programmable via a communication bus of the multiviewer system, and wherein the communication bus is based on a Message Queuing Telemetry Transport protocol, an Advanced Message Queuing Protocol, a Constrained Application Protocol, or an Extensible Messaging Presence Protocol.

* * * * *